United States Patent
Iancu et al.

(10) Patent No.: US 7,346,114 B2
(45) Date of Patent: Mar. 18, 2008

(54) RECEIVER WITH SIGNAL OFFSET ESTIMATOR AND SYMBOL SYNCHRONIZING GENERATOR

(75) Inventors: Daniel Iancu, Pleasantville, NY (US); Hua Ye, Durham, NC (US); John Glossner, Carmel, NY (US); Youssef Abdelilah, Holly Springs, NC (US)

(73) Assignee: Sandbridge Technologies Inc., White Plains, NY (US)

( * ) Notice: Subject to any disclaimer, the term of this patent is extended or adjusted under 35 U.S.C. 154(b) by 32 days.

(21) Appl. No.: 10/574,585
(22) PCT Filed: Jun. 7, 2005
(86) PCT No.: PCT/US2005/019814

§ 371 (c)(1),
(2), (4) Date: Apr. 4, 2006

(87) PCT Pub. No.: WO2005/125136

PCT Pub. Date: Dec. 29, 2005

(65) Prior Publication Data

US 2007/0183514 A1 Aug. 9, 2007

Related U.S. Application Data

(60) Provisional application No. 60/577,602, filed on Jun. 8, 2004.

(51) Int. Cl.
H04K 1/10 (2006.01)
(52) U.S. Cl. .................................................. 375/260
(58) Field of Classification Search ............... 375/316, 375/147, 322, 324, 130; 455/109, 182.2, 455/192.2

See application file for complete search history.

(56) References Cited

U.S. PATENT DOCUMENTS

| 5,467,132 A | 11/1995 | Fazel |
| 6,091,702 A | 7/2000 | Saiki |
| 6,240,146 B1 | 5/2001 | Stott et al. |
| 6,317,470 B1 | 11/2001 | Kroeger et al. |
| 6,320,917 B1 | 11/2001 | Stott et al. |
| 6,359,938 B1 | 3/2002 | Keevill et al. |

(Continued)

OTHER PUBLICATIONS

"Digital Video Broadcasting (DVB): Framing Structures, Channel Coding, and Modulation for Digital Terrestrial Television," ETSI EN 300 744 V1.4.1 (Jan. 2001).

(Continued)

Primary Examiner—Khai Tran
(74) Attorney, Agent, or Firm—Barnes & Thornburg LLP

(57) ABSTRACT

A receiver for orthogonal frequency division multiplexing signals, including art A/D converter for converting receiver analog signals to a digital signal data stream, wherein the digital signal data stream includes symbols separated by guard segments. The receiver also includes an I/Q demodulator for producing a first set of complex I and Q components from the digital signal data stream and a guard segment length detector using the first set of I and Q components. It further includes an extractor for identifying and removing the guard segments of the detected length from the digital signal data stream and an FFT demodulator for demodulating the symbols of the digital signal data stream to produce second sets of complex I and Q components.

10 Claims, 6 Drawing Sheets

U.S. PATENT DOCUMENTS

| | | | |
|---|---|---|---|
| 6,687,315 | B2 | 2/2004 | Keevill et al. |
| 2001/0024475 | A1 | 9/2001 | Kumar |
| 2003/0219084 | A1* | 11/2003 | Parker .................. 375/343 |
| 2004/0052205 | A1* | 3/2004 | Ohtaki et al. ............ 370/206 |
| 2004/0184561 | A1* | 9/2004 | Harada et al. ............ 375/316 |
| 2005/0069054 | A1 | 3/2005 | Zhidkov |

OTHER PUBLICATIONS

Glossner, J., et al., "Multi-Threaded Processor for Software-Defined Radio," Proceedings of the 2002 Software Defined Radio Technical Conference, 1: pp. 195-199, San Diego, CA, Nov. 2002.

Surducan, E., et al., "Modified Printed Dipole Antennas for Wireless Multi-Band Communication Devices," *URSI EMTS Int. Sym. on Electromagnetic Theory*, pp. 161-163, Pisa, Italy, May 2004.

Glossner, J., et al., A Software Defined Communications Baseband Design, *IEEE Communications Magazine*, 41:1, pp. 120-128, Jan. 2003.

Bolcskei, H., et al., "Impact of the Propagation Environment on the Performance of Space-Frequency Coded MIMO-OFDM," *IEEE J. on Sel. Areas in Comm.*, 21:3, Apr. 2003.

Beng, Y.C., "Effects of Mutual Coupling in Small Dipole Array Antennas," MS Thesis, Naval Postgraduate School, Monterey, CA Mar. 2002.

Van Nee, R. et al., "OFDM For Wireless Multimedia Communications," Artech House Publishers, 2000.

Brigham, E.O., "The Fast Fourier Transform and its Applications," Prentice-Hall, Inc., 1998.

\* cited by examiner

RECEIVER WITH SIGNAL OFFSET ESTIMATOR AND SYMBOL SYNCHRONIZING GENERATOR

CROSS-REFERENCE

This application claims the benefit of U.S. Provisional Patent Application Ser. No. 60/577,602 filed on Jun. 8, 2004, which is incorporated herein by reference.

BACKGROUND AND SUMMARY OF THE DISCLOSURE

The present invention relates generally to communication receivers and, more specifically, to orthogonal frequency division multiplexing (OFDM) receivers.

The following disclosure will describe a digital video broadcasting (DVB) receiver for digital terrestrial television (DTV). The concepts are equally applicable to any other channels of transmission of DTV receivers and to other receivers or standards using orthogonal frequency division multiplexing (OFDM). These may include but not be limited to wireless standards worldwide such as wireless LAN 802.11a and g, HIPERLAN/2, Digital Audio Broadcasting (DAB), Digital Video Broadcasting Terrestrial (DVB-T), Digital Video Broadcasting for handheld (DVB-H), 802.16 Broadband Wireless Access, etc The European terrestrial DTV standard DVB-T (ETS 300 744) is based on COFDM technologies to combat multipath fading. See ETSI EN 300 744 V.1.4.1 "Digital Video Broadcasting (DVB): Framing Structures, channel coding, and modulation for digital terrestrial television." It specifies two operational modes:
1) A 2K mode based on 2048 FFT and having 1,705 carriers per OFDM symbol; and
2) An 8K mode based on 8192 FFT and having 6,817 carriers per OFDM symbol.

FIG. 1 shows a block diagram for a typical DVBT receiver. The digital signal processing for a DVBT receiver can be partitioned into three portions. The first portion 10 includes an RF front end 12, and A/D converter 14, an OFDM demodulator 16, a demodulation 18 and a pilot and TPS decoder 19. This receiver front-end signal processing portion performs receiver training, including various synchronization and channel estimation and OFDM demodulation. The second portion 20 is the DVBT receiver back-end signal processing block. It performs DVBT inner channel decoding and outer channel decoding. The third portion 30 is a MPEG Decoder. An example is shown in U.S. Pat. No. 6,359,938.

Due to computational complexity and high MIPs required for the DVBT receiver, until recently, DVBT receivers have been implemented in hardware using ASICs. In the case of multi-protocol communication systems, the hardware implementation becomes less attractive due to extra chip cost and PC board area consumed. In this disclosure, an improved software implementation of a DVBT receiver is described. In this design, all functions associated with the DVBT receiver may be implemented in software in the Sandbridge Technologies Multithreaded SB9600 processor. The device may be used in hand-held devices, such as mobile phones and PDAs.

The receiver includes an A/D converter for converting receiver analog signals to a digital signal data stream, wherein the digital signal data stream includes symbols separated by guard segments. The receiver also includes an I/Q demodulator for producing a first set of complex I and Q components from the digital signal data stream and a guard segment length detector using the first set of I and Q components. It further includes an extractor for identifying and removing the guard segments of the detected length from the digital signal data stream and an FFT demodulator for demodulating the symbols of the digital signal data stream to produce second sets of complex I and Q components.

The FFT demodulator is an orthogonal frequency division multiplexing demodulator and the receiver may be a digital video broadcasting receiver. The FFT demodulator demodulates two symbols at one time to produce the second sets of complex I and Q components. A processor is programmed to operate as the I/Q demodulator, the guard segment length detector, the extractor, and the FFT demodulator. The FFT demodulator is an orthogonal frequency division multiplexing demodulator, and the receiver may be a digital video broadcasting receiver.

The receiver may include at least two antennas each connected to a respective receiver front-end and A/D converter. The at least two antennas are orthogonally positioned and the receiver front-end includes a phase shifter.

The receiver includes a first carrier signal offset estimator and a first symbol synchronizing signal generator, each using the first set of I and Q components, to estimate the offset of the carrier signal and adjusting the A/D converter and to generate a symbol synchronizing signal for the extractor, respectively, at least during an initialization phase of the receiver. The I/Q demodulator, the guard segment length detector, the first carrier signal offset estimator, and the first symbol synchronizing signal generator operate only during the initialization phase of the receiver. The receiver includes a second carrier signal offset estimator and a second symbol synchronizing signal generator, each using the second sets of I and Q components from the FFT demodulator, to estimate the offset of the carrier signal and adjusting the A/D converter and to generate a symbol synchronizing signal for the extractor, respectively, at least after an initialization phase of the receiver.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
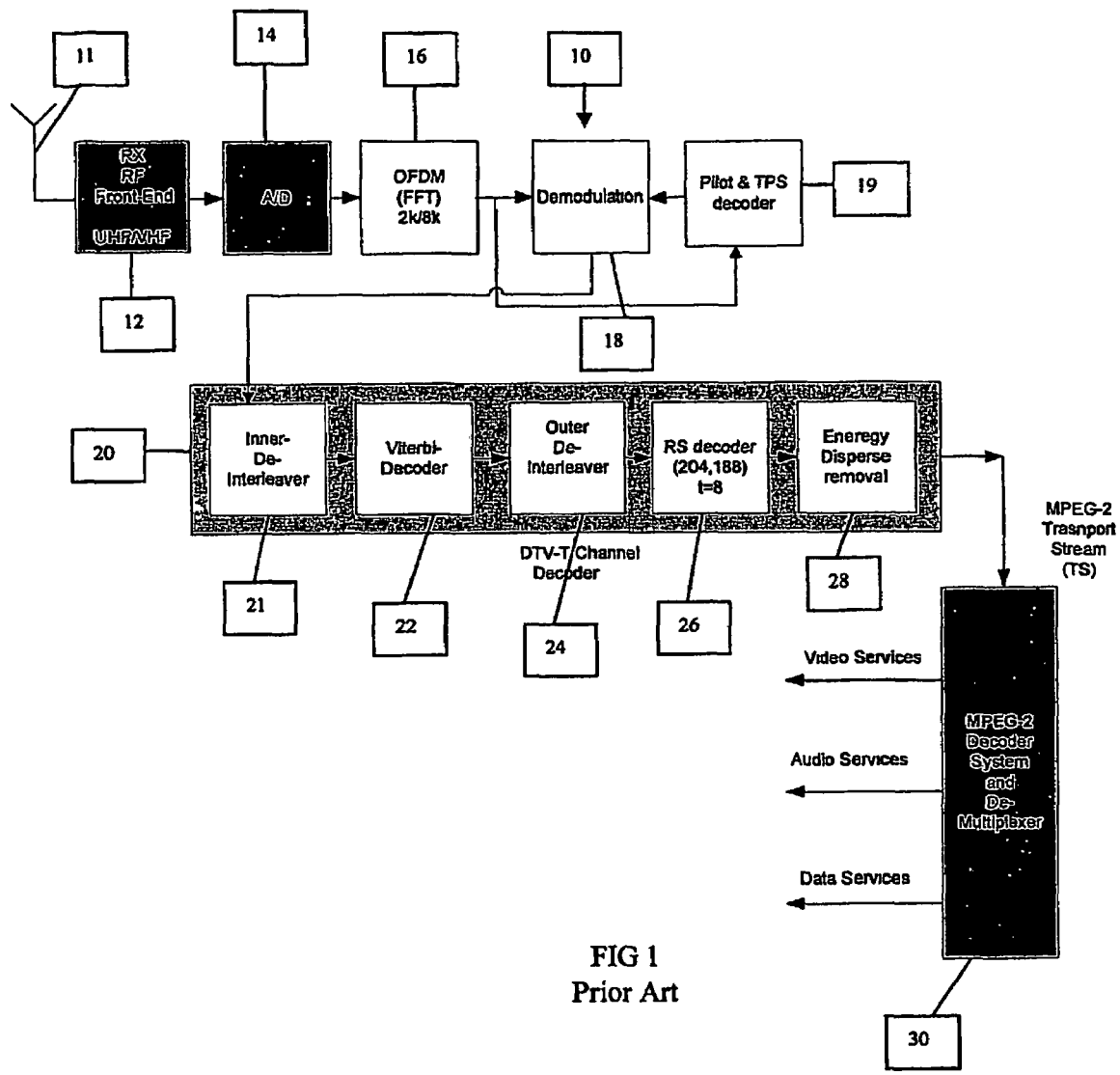
FIG. 1 is a block diagram of a digital video broadcasting terrestrial receiver, according to the prior art for a single input single output (SISO) system.

A digital video broadcasting/terrestrial receiver of the prior art is illustrated in FIG. 1. The first portion 10 includes an RF receiver front end 12 for receiving UHF and VHF signals from antenna 11 and A/D converter 14. The signals are then provided to an OFDM demodulator 16. The output of the OFDM demodulator 16 is connected to Demodulator 18 and Pilot and TPS decoder 19. These block performs receiver training, including various synchronization and channel estimation and the OFDM demodulation.

The various signals (including, for example, the complex I and Q components of the digital signal) are provided to the receiver back-end signal processing block 20. This includes inner-deinterleaver 21, a Viterbi decoder 22, an outer deinterleaver 24, an RS decoder 65 and an energy disperse removal 28. The output of the back-end signal processing block 20 is provided to an MPEG decoder/demultiplexer portion 30. The output signals may be, for example, video services, audio services and data services.

Figure 2:
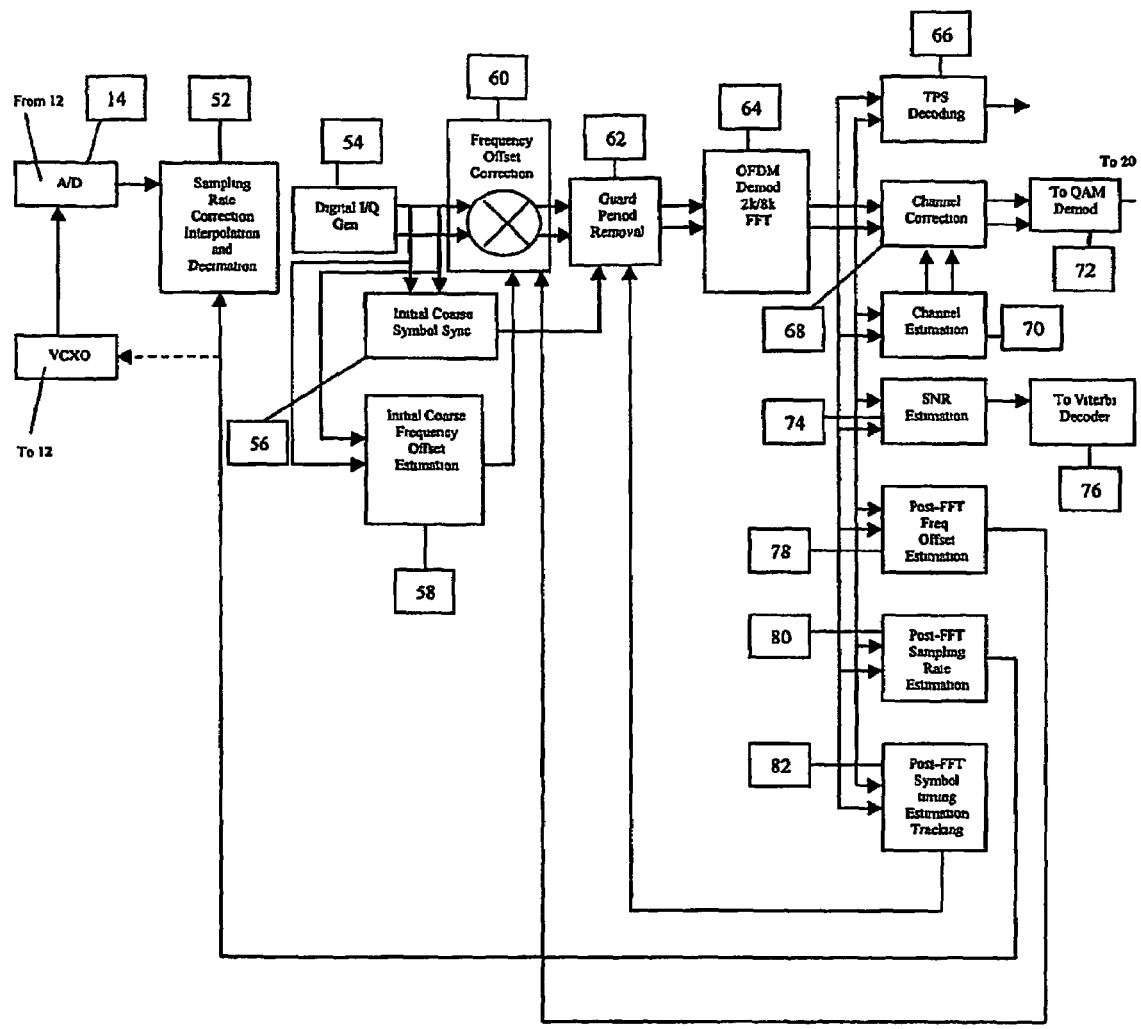
FIG. 2 is a block diagram of the orthogonal frequency division multiplexing demodulator of the prior art.

A more detailed description of the Front end 10 is shown in FIG. 2. The RF processed analog signal from RF front-end receiver 12 is provided to the A/D converter 14. The digital signal is provided to a sampling rate correction interpolation and decimation process 52. The output of 52 is then provided to a digital I/Q generator 54, which generates the complex I and Q components or signals required for the OFDM demodulator 64. The complex I/Q signal is provided to the initial course symbol synchronization portion 56 and to the guard segment length detector and coarse frequency offset estimator 58. The carrier frequency offset may be corrected digitally by properly de-rotating the I/Q signals at the frequency offset correction 60. This uses the initial coarse frequency offset estimation of 58. The guard segment length can be detected at 58 and the corresponding guard segment period removed at 62 From the I/Q signal stream.

The digital signal data stream (without the guard segments) is then processed by the FFT demodulator 54, which performs a fast Fourier Frequency Transformation (FFT) on the complex I/Q signals. A 2048 point complex FFT is performed for the 2K mode, and a 8192 point complex FFT is performed for an 8K mode. These are the modes used in the previously mentioned standard.

The demodulated OFDM symbols, as complex I/Q components, are provided to the TPS decoder 66, the channel correction 68 and channel estimation 70. The channel correction 68, having input also from the channel estimation 70, provides an output for the QAM demapper 72, which provides the output to the receiver back-end processing block 20. The I/Q signals out of the OFDM demodulator 64 are also provided to the SNR estimator 74, which provides input to the Viterbi decoder 76. The demodulated I/Q signals are also provided to the post-FFT frequency offset estimation 78, which provides a feedback to the frequency offset correction portion 60. The demodulated I/Q signals are also provided to the post-FFT sampling rate estimator 80, which provides a feedback signal to the sampling rate correction interpolation and decimation portion 52. The demodulated I/Q signals are provided to the post-FFT symbol timing estimation tracking portion 82, which provides a feedback to the guard period removal 62.

It should also be noted that the post-FFT sampling rate estimation circuit 80 also provides a signal to the voltage control oscillator 84, which provides a signal back to the RF receiver 12 for the adjustment of the final LO frequency of the analog receiver circuit 12 and to the A/D converter 14 for adjusting the A/D sampling rate.

The digital generation of the complex I/Q signals at 54 produces computational complexity and high MIPs required for the receiver.

The present disclosure, as will be noted below, only uses the digital complex I/Q signal generation during the initialization phase required for the initial symbol synchronization, guard length detector and initial coarse frequency offset estimation. Subsequently, the operation of the OFDM demodulator 64 is performed in such a way as to produce the required demodulated complex I/Q components without a digital I/Q generator 54.

Figure 3:
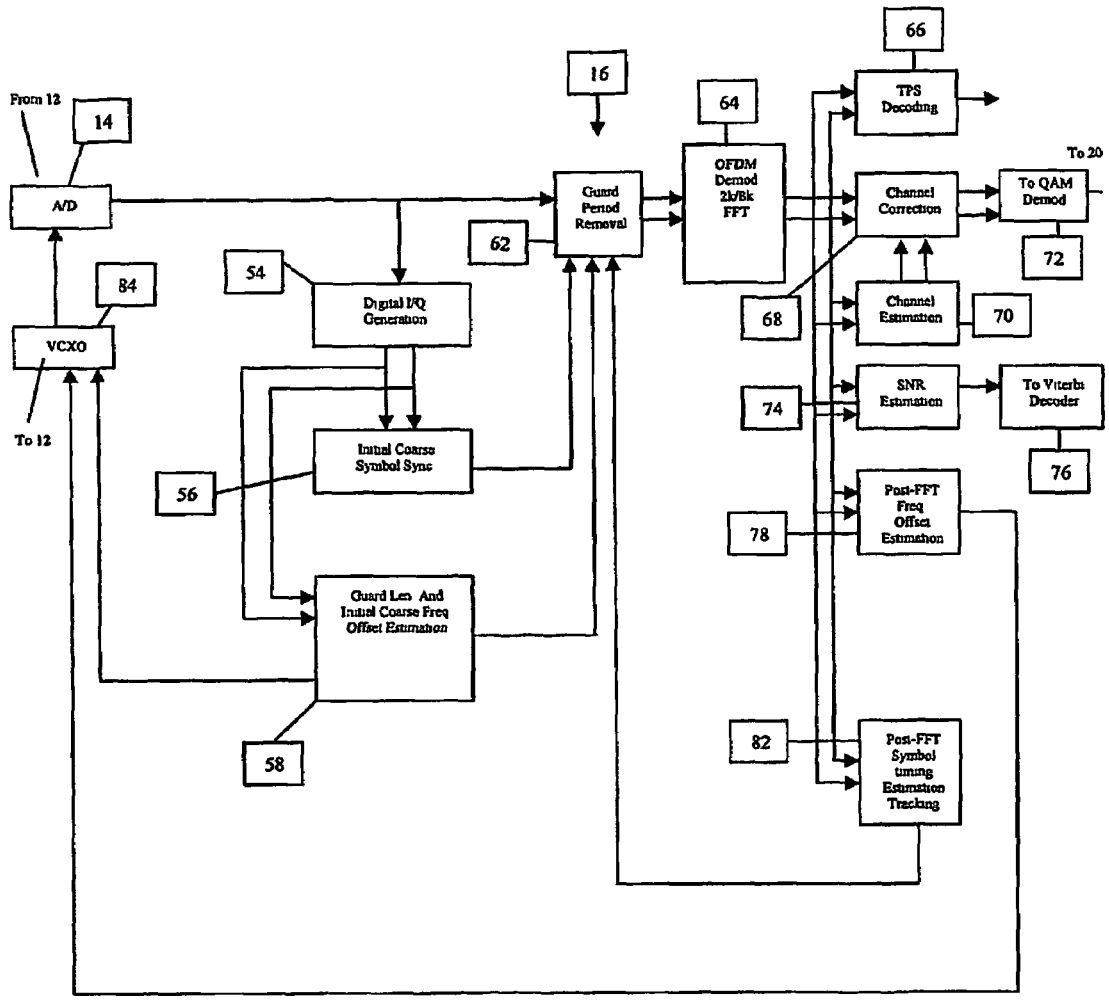
FIG. 3 is a block diagram of an orthogonal frequency division multiplexer demodulator, according to the present disclosure.

A modified OFDM front-end signal processing architecture is shown in FIG. 3. The receiver performs 2*N real input FFT (where N=2048 for 2K mode and N=8192 for 8K mode) for each received OFDM symbol. Further, the receiver can process two OFDM symbols per processing so that two 2*N real input FFT can be computed at the cost of one 2*N complex input FFT. Compared to the conventional DVBT OFDM front-end signal processing architecture of FIG. 2, the present architecture of FIG. 3 renders all the MIP intensive preprocessing before FFT demodulation unnecessary after initialization.

Although digital I/Q generation is initially required for the initial coarse symbol synchronization block 56 and the guard length detection/coarse fractional carrier frequency offset estimation block 58, this is only run once in the initial startup of our all software DVBT receiver, and it has the whole digital signal processor MIP resource available for its use after initialization.

The DVBT signal occupies a bandwidth of approximately 7.61 MHz. The signal modulated onto a center carrier is real as defined in the DVB standard. However, complex representation is required for the baseband DVBT signal. This is due to the fact that the DVBT baseband spectrum is not symmetrical around the middle frequency. This is the reason why MIP intensive preprocessing is required for generating the I/Q complex signals in conventional DVBT receiver. However, if the DVBT signal is kept in passband for FFT input, then the FFT input can be real, so that no I/Q generation would be required.

Further, the final stage LO and A/D sampling rate have to be carefully chosen to avoid any expensive interpolation and decimation that are sometimes required in conventional DVBT receiver. For 2K mode, the carrier spacing is f=4464 Hz, and the sampling rate fs has to be exactly 2*2048*f=18.284544 MHz. The final LO frequency f_LO has to be set exactly as: fs=4*f_LO.

For 4K mode, the carrier spacing is f=2232 Hz, and the sampling rate fs has to be exactly 2*4096*f=18.284544 MHz. The final LO frequency f_LO has to be set exactly as: fs=4*f_LO.

The above sampling rate fs and final LO frequency setting should also work for the 8K mode since the carrier spacing is now f=1116 Hz, the sampling rate fs should be exactly 2*8192*f=18.284544 MHz, and the final LO frequency should be: fs=4*f_LO.

The elements of FIG. 3 have the same functions or related functions as those of FIG. 2. The analog signal from the receiver 12 is provided to A/D converter 14. The output of the A/D converter 14 is provided to the digital I/Q generator 54, as well as to the guard period removal 62. This distinguishes FIG. 3 from FIG. 2, wherein the guard period removal section 62 receives the digitally generated I/Q signal after frequency offset correction. The digital I/Q signals are provided to the initial coarse symbol synchronization portion 56 and the guard length detector and coarse frequency offset estimator 58. The detector and initial coarse frequency offset estimation 58 are provided to the guard period removal section 62.

The output of the guard period removal 62 is a digital stream and is provided to the OFDM FFT demodulator 64. As distinguished from FIG. 2, this is not I/Q complex symbols but merely the digital signal data stream without the guard period. In FIG. 3, as previously mentioned, the OFDM demodulator 64 processes two symbols at a time and produces (without the digital I/Q generation 54) the complex I/Q components.

These I/Q components are provided to the TPS decoder 66, the channel correction 68, the channel estimation 70, the SNR estimation 74, the post-FFT frequency offset estimation 78 and the post-FFT symbol timing estimation tracking 82. As in FIG. 2, the channel correction 68 also receives signals from the channel estimation 70 and provides inputs to the QAM demapper 72. The SNR estimation 74 provides input to the Viterbi decoder 76. The post-FFT frequency offset estimation 78 provides a feedback signal to the voltage control oscillator VCXO 84, which provides the sampling rate signal to A/D converter 14, as well as a feedback signal to the RF receiver 12. The voltage control oscillator 84 also receives an initial frequency offset estimation from the initial coarse frequency offset estimator 58. The post-FFT symbol timing estimation tracking 82 provides a feedback signal to the guard period removal portion 62, as in FIG. 2.

While the initial coarse symbol synchronization portion 56 and the guard length detector and initial coarse frequency offset estimation 58 are only performed during the initialization, as in FIG. 2, the digital I/Q generation 54 is also only performed in the initialization stage. It should be noted that the I/Q or demodulator 54, the guard segment length detector and initial coarse frequency offset estimation 58, the initial coarse symbol synchronization 56, the guard period removal 62 and the OFDM demodulator are all performed in software.

Figure 4:
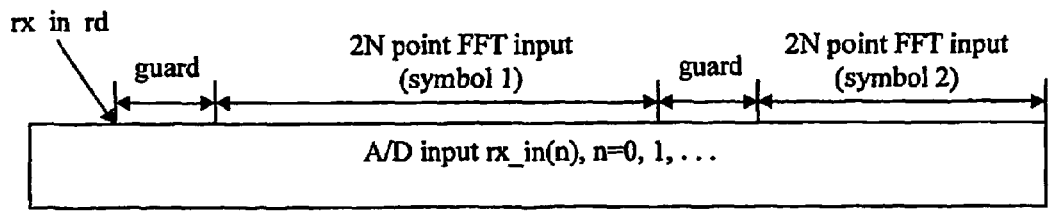
FIG. 4 shows an off-frequency division multiplexer symbol extraction, according to the present disclosure.

FIG. 4 shows how OFDM symbols are extracted from A/D input signal data stream. Let the A/D input data stream sampling at fs be stored in a buffer called rx_in. Buffer holding rx_in should be large enough to hold more than two OFDM symbol worth of data samples, including all possible guard lengths. The rx_in read pointer rx_in_rd is controlled by the symbol synchronization algorithm and should point to the starting point of the current OFDM symbol. As depicted in FIG. 4, two 2N points are extracted from the input signal stream for symbol 1 and symbol 2. It is well known that one can perform two 2N point real input FFT at the cost of one complex input FFT. Two OFDM symbols are processed at one time to produce I/Q without the intensive processing required by the I/Q demodulator/generator portion 54.

Figure 5:
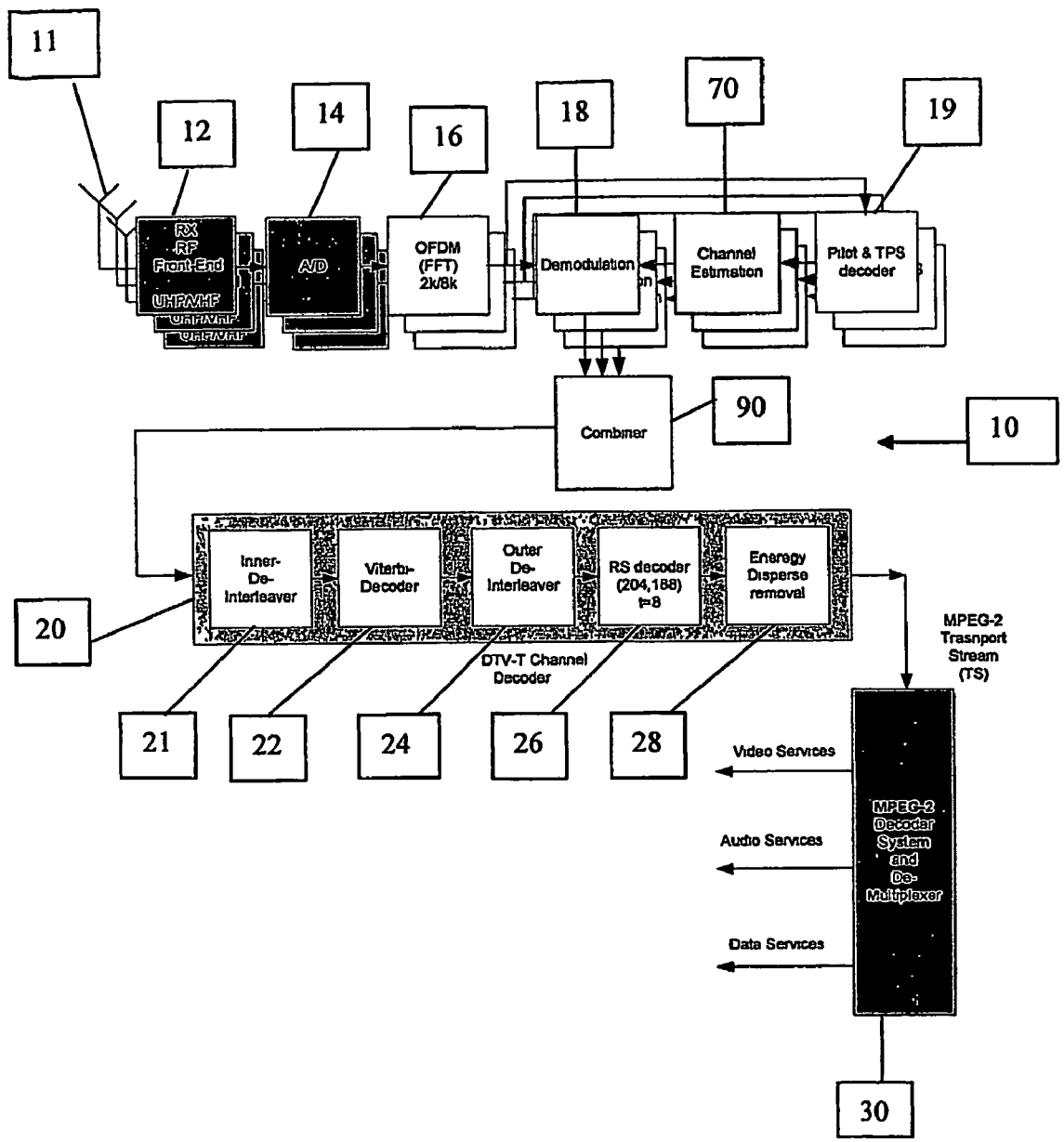
FIG. 5 is a block diagram of a digital video broadcasting terrestrial receiver, according to the present disclosure for a multiple input multiple output (MIMO) system.

A MIMO OFDM receiver as an extension of the SISO by adding more receiver paths is illustrated in FIG. 5. Each receiver path requires a separate set of RF antenna 11 and analog front-end circuitry and a separate signal processing channel in the same or separate side band digital signal processor depending on the volume of required computations. The front-end processed signal from the plural front-end signal processing block 10 are combined at 90 and provided as a single input to the back-end signal processing block 20 Each receiver signal processing channel must perform separate timing synchronization, frequency offset estimation, correction and channel estimation. The SISO DVB-T receiver of FIGS. 1-3 performs poorly in the presence of NLOS (No-Line Of Sight) radio channel that can be modeled as Rayleigh fading. The SNR/BER improvement in MIMO-OFDM receiver of FIG. 5 is obtained by coherently combining the received signal from multiple receiver branches.

Figure 6:
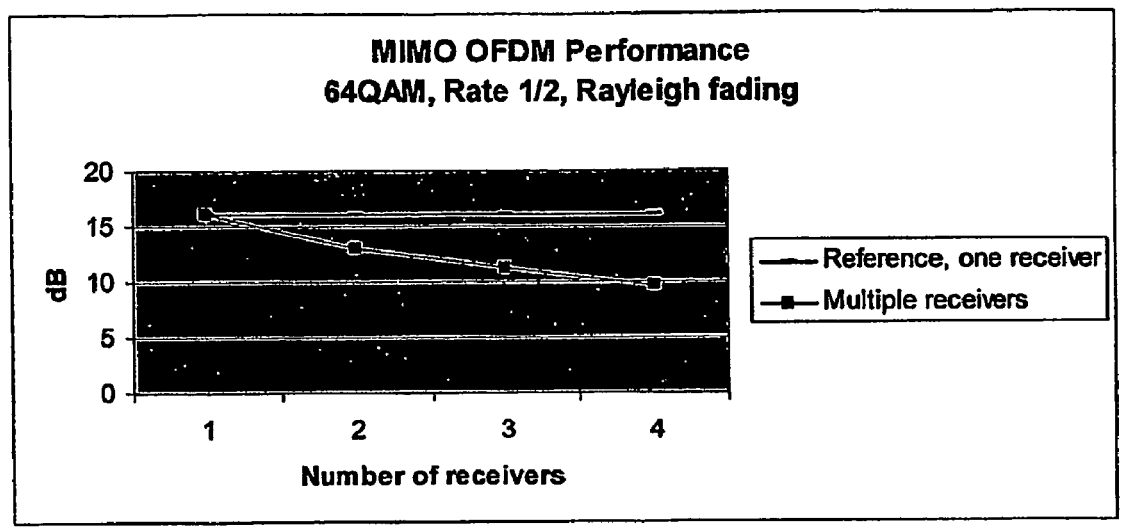
FIG. 6 is a graph of the Rayleigh fading of a MIMO system as a function of the number of receivers.

FIG. 6 shows the performance improvement for MIMO-OFDM receiver with receiver spatial diversity. The simulation is set to 64 QAM mode, Rate ½, and portable Rayleigh fading channel model conforming to ETSI EN 300 744 V1.4.1 (2001-01). The plot shows SNR (at which the DVB-T receiver will be able to achieve QEF conditions) improvement from two, three and four receiver antennas. Generally speaking, more antennas will provide better SNR improvement at the cost of increased receiver complexity.

From the performance shown in FIG. 6, by adding a second receiver the gain increases with 2.3 dB while adding three more receivers the gain will increase by 5.2 dB for the Ricean channel fading case. Adding more than two receivers, in addition to the associated increased cost, there is also another undesired phenomenon, namely the mutual coupling of the antennas. In order to uncouple the antennas an uncoupling network needs to be added to the front end. Therefore, the gain achieved by adding more channels will be mainly lost by the added insertion loss. A good compromise will be to use only to receivers with mutually orthogonal antennas as illustrated in FIGS. 7 and 8.

Figure 7:
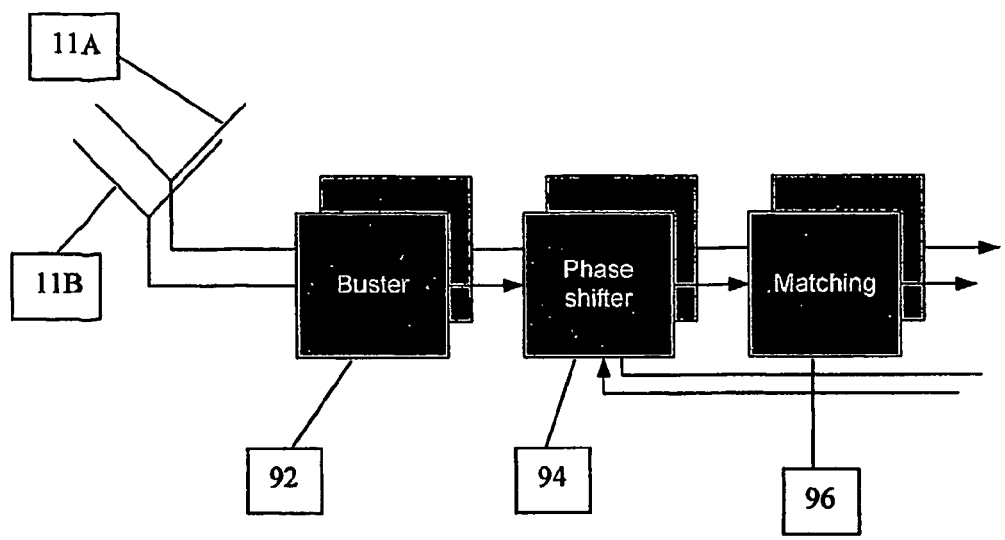
FIG. 7 is a block diagram of a receiver's front end using two mutually orthogonal antennas.

In FIG. 7, the RF signal coming from the antennas 11A and 11B are amplified by booster 92 and than fed into a phase shifter 94 controlled by the digital signal processor. The phase shifter 94 will shift the incoming waveform by an angle determined by the digital signal processor, such that the signals from the two antennas are combined coherently. The phase shifted signals are provided to the A/D converter 14 via matching circuit 96

Figure 8:
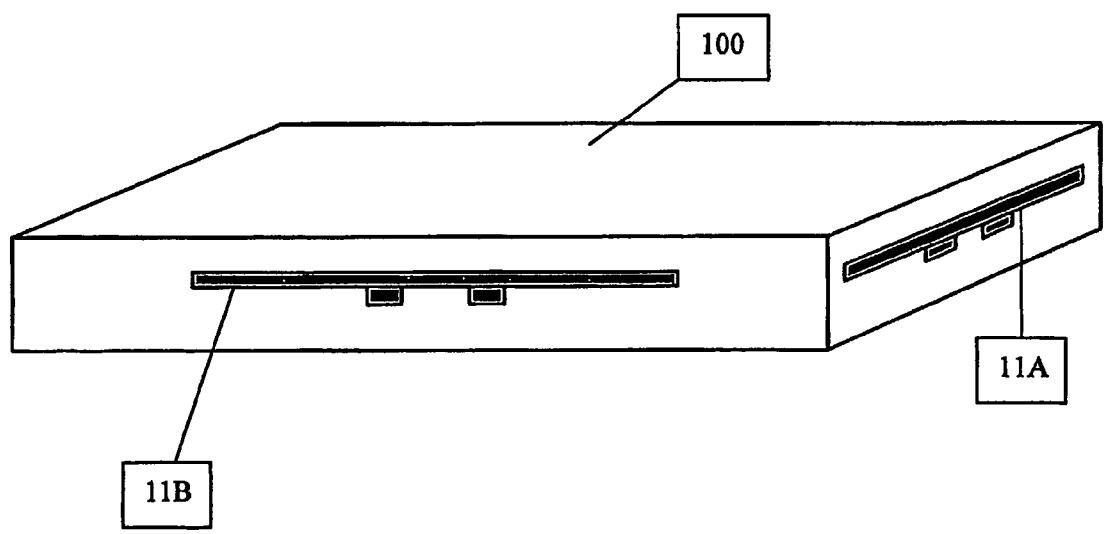
FIG. 8 is a diagram of the two antennas of FIG. 7 on a device.

FIG. 8 shows the placement of the two antennas 11A and 11B on the hand held device 100. The antennas are orthogonally positioned.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed is:

1. A receiver comprising:
   an A/D converter for converting receiver analog signals to a digital signal data stream, wherein the digital signal data stream includes symbols separated by guard segments;
   an I/Q demodulator for producing a first set of I and Q components;
   a first carrier signal offset estimator and a first symbol synchronizing signal generator, each using the first set of I and Q components, to estimate the offset of the carrier signal and provide a signal for adjusting the A/D converter and to generate a symbol synchronizing signal for the extractor, respectively, at least during an initialization phase of the receiver;
   a guard segment length detector using the first set of I and Q components;
   an extractor for identifying and removing the guard segments of the detected length from the digital signal data stream; and
   an FFT demodulator for demodulating the symbols of the digital signal data stream to produce second sets of complex I and Q components.

2. The receiver according to claim 1, wherein the FFT demodulator demodulates two symbols at one time to produce the second sets of complex I and Q components.

3. The receiver according to claim 2, wherein the FFT demodulator operates in one of a 4K mode for a 2K requested mode and 16K mode for an 8K requested mode.

4. The receiver according to claim 1, wherein I/Q demodulator, the guard segment length detector, the first carrier signal offset estimator, and the first symbol synchronizing signal generator operate only during the initialization phase of the receiver.

5. The receiver according to claim 1, including a second carrier signal offset estimator and a second symbol synchronizing signal generator, each using the second sets of I and Q components from the FFT demodulator, to estimate the offset of the carrier signal and provide a signal for adjusting the A/D converter and to generate a symbol synchronizing signal for the extractor, respectively, at least after an initialization phase of the receiver.

6. The receiver according to claim 1, including a processor programmed to operate as the I/Q demodulator, the guard segment length detector, the extractor and the FFT demodulator.

7. The receiver according to claim 1, wherein the FFT demodulator is an orthogonal frequency division multiplexing demodulator.

8. The receiver according to claim 1, wherein the receiver is a digital video broadcasting receiver.

9. The receiver according to claim 1, wherein the receiver includes at least two antennas each connected to a respective receiver front-end and A/D converter.

10. The receiver according to claim 9, wherein the at least two antennas are orthogonally positioned and the receiver front-end includes a phase shifter.

* * * * *